US010841693B1

(12) United States Patent
Ganeshkumar et al.

(10) Patent No.: US 10,841,693 B1
(45) Date of Patent: Nov. 17, 2020

(54) AUDIO PROCESSING FOR WEARABLES IN HIGH-NOISE ENVIRONMENT

(71) Applicant: Bose Corporation, Framingham, MA (US)

(72) Inventors: Alaganandan Ganeshkumar, North Attleboro, MA (US); Elie Bou Daher, Marlborough, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/571,511

(22) Filed: Sep. 16, 2019

(51) Int. Cl.
| | |
|---|---|
| H04R 3/00 | (2006.01) |
| G10L 21/0208 | (2013.01) |
| H04R 1/40 | (2006.01) |
| H04R 1/10 | (2006.01) |
| G10L 25/51 | (2013.01) |
| G06F 1/16 | (2006.01) |
| G10K 11/178 | (2006.01) |
| G10L 21/0216 | (2013.01) |

(52) U.S. Cl.
CPC ............ *H04R 3/005* (2013.01); *G06F 1/163* (2013.01); *G10K 11/178* (2013.01); *G10L 21/0208* (2013.01); *G10L 25/51* (2013.01); *H04R 1/1083* (2013.01); *H04R 1/406* (2013.01); *G10L 2021/02165* (2013.01)

(58) Field of Classification Search
CPC ...... H04R 3/005; H04R 1/1083; H04R 1/406; G06F 1/163; G10K 11/178; G10L 21/0208; G10L 25/51; G10L 2021/02165
See application file for complete search history.

(56) References Cited

U.S. PATENT DOCUMENTS

| | | | |
|---|---|---|---|
| 10,171,719 B1* | 1/2019 | Fitzgerald | A42B 1/006 |
| 10,311,889 B2 | 6/2019 | Ganeshkumar et al. | |
| 10,313,782 B2* | 6/2019 | Dusan | H04R 1/1091 |
| 2003/0069727 A1* | 4/2003 | Krasny | G10L 15/20 |
| | | | 704/228 |
| 2016/0100649 A1* | 4/2016 | Glezerman | A42B 3/04 |
| | | | 455/41.2 |
| 2016/0219962 A1* | 8/2016 | Abers | A42B 1/245 |
| 2018/0270565 A1 | 9/2018 | Ganeshkumar | |

\* cited by examiner

*Primary Examiner* — Andrew L Sniezek
(74) *Attorney, Agent, or Firm* — Hoffman Warnick LLC

(57) ABSTRACT

Various implementations include a wearable audio device that includes an array of microphones and an audio processing system for processing audio signals from the array of microphones. The audio processing system includes a system for analyzing the audio signals and generating a first set of sub-array signals that preserve signals originating from a mouth of a user using a fixed coefficient beamformer, and generating a second set of sub-array signals associated with noise sources originating from directions other than the mouth of the user, wherein each sub-array signal includes a sub-combination of signals from the array of microphones; a primary generator that generates a primary signal by combining the first set of sub-array signals; and an adaptive filter for processing the primary signal, wherein the adaptive filter utilizes the second set of sub-array signals as a set of noise reference signals to adaptively steer a null towards the noise sources to generate an enhanced primary signal.

24 Claims, 6 Drawing Sheets

AUDIO PROCESSING FOR WEARABLES IN HIGH-NOISE ENVIRONMENT

TECHNICAL FIELD

This disclosure generally relates to audio processing in wearable audio devices. More particularly, the disclosure relates to audio processing in wearable audio devices configured to enhance voice signals in noisy environments.

BACKGROUND

Wearable audio devices can significantly improve communication between users in noisy environments, e.g., in industrial use applications or other areas with high levels of background noise. Conventionally, these devices employ a "boom" microphone (e.g., microphone placed on a boom or arm) that is placed next to the user's mouth to aid in voice pickup and noise cancellation. While boom microphones can be useful for communication purposes, these microphones are not practical in all instances. For example, the user must actively position the boom to enhance effectiveness. Additionally, the boom and microphone can reduce the user's field of vision, creating challenges in a dynamic and/or dangerous environment.

SUMMARY

All examples and features mentioned below can be combined in any technically possible way.

Systems and methods are provided that achieve equivalent boom microphone performance using a head worn microphone array that enables the user to talk naturally and comfortably without the distraction of a boom extending over their face.

The industrial wearable form factor enables easier mounting of a larger microphone array, which can for instance be mounted on the brim of a helmet (or similar headgear). By placing an array of microphones on an underside of the brim, desired signals can be steered downwards towards the mouth while achieving noise rejection in the straight ahead direction. This is something usually easily achieved with a boom microphone but not with microphones mounted close to the ear as in headsets.

Utilizing a head based wearable such as a helmet further allows for incorporation of a wide band accelerometer that can make good contact with the head to sense bone conducted vibration of the user's voice.

Audio processing techniques disclosed herein improve communication in windy situations often encountered in certain industrial settings such as oil exploration.

One aspect provides a method of enhancing speech from a user of a wearable audio device, comprising: receiving a plurality of signals derived from an array of microphones; processing the plurality of signals with a fixed coefficient beamformer to generate a first set of sub-array signals that preserve signals originating from a mouth of the user and a second set of sub-array signals associated with noise sources originating from directions other than the mouth of the user, wherein each sub-array signal includes a sub-combination of signals from the array of microphones; generating a primary signal by combining the first set of sub-array signals; and processing the primary signal with an adaptive filter, wherein the adaptive filter utilizes the second set of sub-array signals as a set of noise reference signals to adaptively steer a null towards the noise sources to generate an enhanced primary signal.

Another aspect provides a wearable audio device that includes: an array of microphones; and an audio processing system for processing audio signals from the array of microphones, including: a system for analyzing the audio signals and generating a first set of sub-array signals that preserve signals originating from a mouth of a user using a fixed coefficient beamformer, and generating a second set of sub-array signals associated with noise sources originating from directions other than the mouth of the user, wherein each sub-array signal includes a sub-combination of signals from the array of microphones; a primary generator that generates a primary signal by combining the first set of sub-array signals; and an adaptive filter for processing the primary signal, wherein the adaptive filter utilizes the second set of sub-array signals as a set of noise reference signals to adaptively steer a null towards the noise sources to generate an enhanced primary signal.

Implementations may include one of the following features, or any combination thereof.

In certain aspects, the method further comprises spectrally subtracting an equalized noise reference signal from the enhanced primary signal to provide a primary voice signal.

In some implementations, filter coefficients associated with the adaptive filter are adjusted when a lack of voice activity is detected by a voice activity detector (VAD) system located at the wearable audio device, and the filter coefficients associated with the adaptive filter are frozen when voice activity is detected by the voice activity detector (VAD) system.

In particular cases, the VAD system comprises an accelerometer VAD in combination with a microphone VAD.

In certain aspects, the accelerometer VAD includes an accelerometer and an acoustic microphone located proximate a rear portion of the wearable audio device, wherein the acoustic microphone provides a noise reference to filter residual noise signal pickup by the accelerometer.

In some implementations, the acoustic microphone is utilized in placed of the microphone array to generate a primary voice signal when extreme noise conditions are detected.

In some cases, the array of microphones is coupled with an underside of the brim, and the brim is configured to mitigate wind noise present at the array of microphones.

In certain implementations, the array of microphones includes at least one boom-let device.

In some aspects, generating the primary signal includes combining the first set of sub-array signals using weighted sums.

In particular cases, the fixed coefficient beamformer uses a minimum variance distortionless response (MVDR) algorithm.

In certain implementations, the wearable audio device comprises at least one of: a hat, a helmet, a visor, a wig, or a hood.

Figure 1:
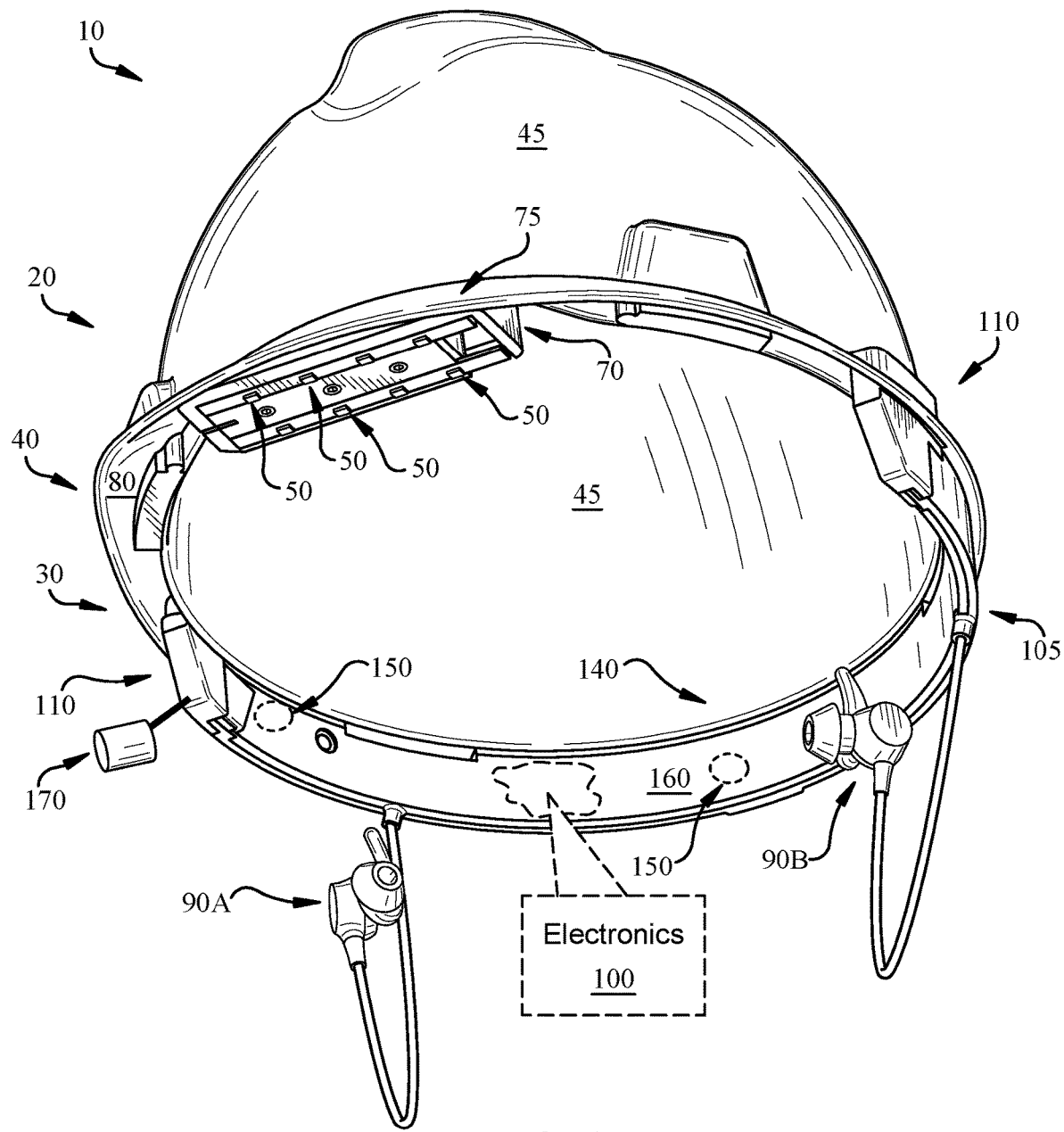
FIG. 1 depicts an isometric view of a wearable having audio processing according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a wearable audio device with brim-mounted microphones can effectively enhance voice pickup in noisy environments. For example, wearable audio devices disclosed according to implementations can provide a user with an effective, hands-free approach for communicating in noisy environments. The systems disclosed according to various implementations can improve communications in such environments.

Commonly labeled components in the FIGURES are considered to be substantially equivalent components for the purposes of illustration, and redundant discussion of those components is omitted for clarity.

Aspects and implementations disclosed herein may be applicable to a wide variety of wearable audio devices in various form factors, such as head-worn devices (e.g., helmets, hats, visors, headsets, eyeglasses), watches, eyeglasses, neck-worn speakers, shoulder-worn speakers, body-worn speakers (e.g., watches), etc. Some particular aspects disclosed may be particularly applicable to personal (wearable) audio devices such as head-mounted audio devices, including helmets, headphones, hats, visors, eyeglasses, hoods, etc.

Figure 2:
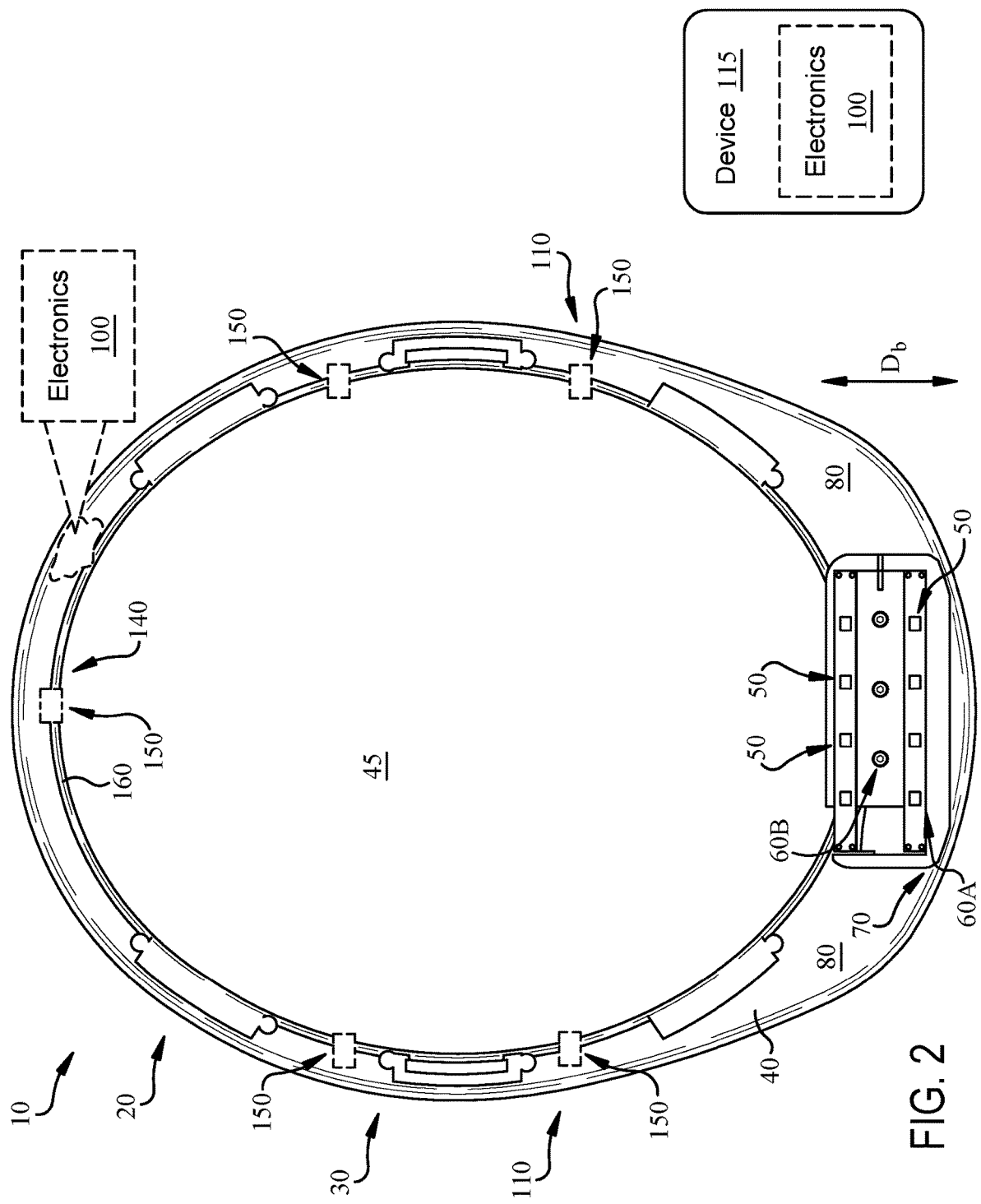
FIG. 2 depicts a plan view of the wearable of FIG. 1 according to various implementations.

FIG. 1 is a schematic perspective view of a wearable audio device 10 according to various implementations. FIG. 2 shows a plan view of the wearable audio device (or simply, "audio device") 10. In this depicted example, the audio device 10 is a head-mounted device configured to fit on or over the head of a user. In some particular cases, the head-mounted device is a helmet (e.g., rigid protective helmet), a hat, a visor, or a headset. Additional form factors are also possible. For example, components of the audio device 10 can be configured to couple with another body-worn or head-worn device, garment, hood, etc., such as a baseball-style cap or other hat. In these examples, the components of the audio device 10 can be configured to couple/decouple with such a body-worn or head-worn device or garment.

In the particular example of a head-mounted audio device 10 depicted in FIGS. 1 and 2, the audio device 10 includes a head mount 20 that has a crown portion (or simply, "crown") 30 and a brim 40 extending from the crown 30. The crown is configured to rest on the user's head, and the brim 40 extends from the crown 30 in a forward-oriented direction. That is, the brim 40 is positioned to extend from the crown 30 in the user's forward-facing direction, and overhang the user's facial features (e.g., nose, mouth, forehead, brows, etc.). In certain cases, such as where the audio device 10 includes a helmet, a hat or other over-the-head style device, the audio device 10 includes a dome portion 45 extending from the crown 30 to cover the top of the user's head. The audio device 10 also includes an array of microphones 50 coupled to the brim 40.

In certain implementations, the array of microphones 50 includes two or more microphones. In more specific implementations, the plurality of microphones 50 includes a matrix of microphones including 3, 4, 5, 6, 7, 8 or more microphones 50. In some cases, the microphones 50 are arranged in one or more N×M matrices, e.g., 2×2, 2×3, 3×3, 3×4, 4×4, etc. In one particular example, as shown in FIGS. 1 and 2, the microphones 50 can be arranged in two columns 60, which are approximately parallel with one another. These columns 60 can each include two or more microphones, and in some cases, four microphones or more. The columns 60 are shown side-by-side, such that one column 60A is located closer to the outer span of the brim 40 than the other column 60B. In some cases, the microphones 50 are indirectly coupled with the brim 40, e.g., contained in a housing 70, that is coupled with the brim 40. In other cases, the microphones 50 are directly coupled with the brim 40.

In various implementations, the brim 40 has an upper surface 75 and a lower surface 80 opposing the upper surface 70. In a forward-oriented position, the lower surface 80 faces generally downward toward the floor or the user's feet. In various implementations, as shown in FIGS. 1 and 2, the microphones 50 are coupled with a lower surface 80 of the brim 40. That is, the microphones 50 are generally oriented in the downward-facing direction. As noted herein the upper surface 75 of the brim 40 can be shaped to shield noise pickup by the microphones 50 from wind in the ambient environment. That is, the positioning of the microphones 50 on the lower surface 80 of the brim 40 aids in reducing detected wind noise at the microphones 50, and as further noted herein, can aid in communication between the user and other users via the audio device 10.

In some additional implementations, as shown in FIG. 1, the audio device 10 includes an additional microphone assembly (i.e., boom-let device) 170 that is coupled with the head mount 20. In various implementations, the microphone assembly 170 includes a set of microphones (e.g., within or coupled to a housing) that are connected to a fixed arm extending from the head mount 20 toward the mouth of the user. In some cases, the arm is approximately 5-10 centimeters (or, several inches) long, and is fixed in position relative to the head mount 20. In some cases, the arm extends from housing 105, but can be physically coupled with other portions of the head mount 20, e.g., the crown 30. Unlike a conventional boom-style microphone, the microphone assembly 170 is fixed relative to the head mount 20, such that the user need not adjust the position of the microphone assembly 170 for different use cases. In various implementations, the microphones in the assembly 170 act as one or more additional sub-arrays (in addition to the microphones 50 mounted to the brim 40) for enhancing audio processing. The microphones in assembly 170 can be located closer to the user's mouth than those microphones 50 mounted at the brim 40, and are positioned at a distinct location in the noise field than those brim-mounted microphones 50.

The audio device 10 can also include a transducer 90 (e.g., electroacoustic transducer or bon conduction transducer) for providing an audio output to a user. In certain cases, as depicted in the example in FIG. 1, the transducer 90 includes a headphone 90A. In this particular depiction, the transducer 90 includes a pair of headphones 90A, 90B, which can in some cases include passive and/or active noise reduction features for enhancing user hearing in a noisy environment. In the specific example depicted in FIG. 1, the headphones 90A, 90B include earphones (earbuds) for positioning in a user's ears. The transducer(s) 90 can be hard-wired and/or wirelessly connected with other components in the audio device 10 and/or other personal electronic devices such as a smart phone, smart watch, smart glasses (including audio playback capabilities), etc. In other examples, the transducer(s) can also be mounted directly to or within the audio device 10 or to a different type of structure coupled to the user's ears (i.e., an on-ear, around-ear, or near-ear coupling structure, some of which may leave the user's ears otherwise open to the environment).

In certain cases, the audio device 10 also includes electronics 100, which are shown in this example as being contained, or substantially contained, within the crown 30 such that a component can extend beyond the boundary of the crown 30. In particular cases, the electronics 100 are contained (or substantially contained) in a housing 105, which can be integral with the crown 30 or detachably coupled to the crown 30, such that the housing 105 can be removed from the crown 30 in particular cases. In certain implementations, separate, or duplicate sets of electronics 100 are contained in portions of the crown 30, e.g., proximate the temple region 110 on each side of the crown 30. However, certain components described herein can also be present in singular form.

It is understood that one or more of the components in electronics 100 may be implemented as hardware and/or software, and that such components may be connected by any conventional means (e.g., hard-wired and/or wireless connection). It is further understood that any component described as connected or coupled to another component in audio device 10 or other systems disclosed according to implementations may communicate using any conventional hard-wired connection and/or additional communications protocols. In various particular implementations, separately housed components in audio device 10 are configured to communicate using one or more conventional wireless transceivers.

Electronics 100 can include other components not specifically depicted herein, such as one or more power sources, motion detection systems (e.g., an inertial measurement unit, or IMU), communications components (e.g., a wireless transceiver (WT)) configured to communicate with one or more other electronic devices connected via one or more wireless networks (e.g., a local WiFi network, Bluetooth/Bluetooth Low Energy connection, or radio frequency (RF) connection), and amplification and signal processing components (e.g., one or more digital signal processors.

Figure 3:
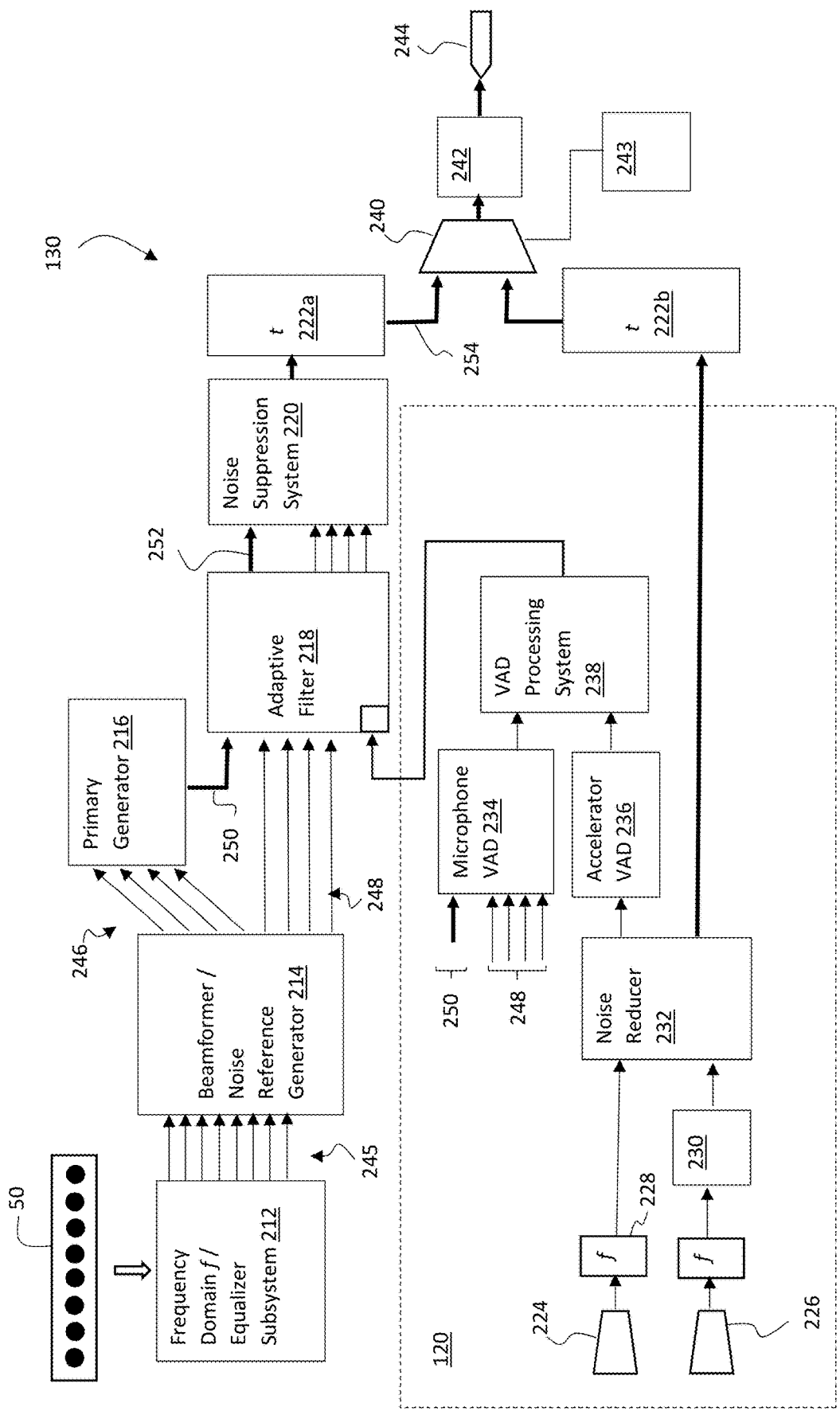
FIG. 3 depicts a block diagram of an audio processing system according to various implementations.

Electronics 100 can include an audio processing system 130, an example of which is shown in FIG. 3. Audio processing system 130 can include conventional hardware, firmware, and/or software components for executing program instructions or code according to processes described herein. For example, audio processing system 130 may include one or more processors, memory, communications pathways between components, and/or one or more logic engines for executing program code. Audio processing system 130 can be coupled with other components in the electronics 100 via any conventional wireless and/or hard-wired connection which allows audio processing system 130 to send/receive signals to/from those components and control operation thereof.

As shown in FIG. 3, audio processing system 130 includes a series of processing stages (212, 214, 216, 218, 220, 222, 240, 242) that process audio information captured by the array of microphones 50 to enhance a detected voice signal, which is provided to an output channel 244. Audio processing system 130 may also utilize a voice activity detector (VAD) system 120 to control elements of the audio processing.

The array of microphones 50 form a set of n channels, which as noted may be arranged in any fashion, e.g., as an N×M matrix, and include any number of channels. Non-limiting illustrative embodiments may for example include six to ten channels, e.g., arranged in a 2×4 matrix, a 1×6 matrix, a 3×3 matrix, etc. Additionally, one or more of the channels may be implemented on the audio device using boom-let devices 170 (FIG. 1) that, e.g., augment an N×M matrix. Regardless of the arrangement, audio signals from the array of microphones 210 are initially processed by a subsystem 212 that converts the time based signals to frequency domain signals f and then equalizes the frequency domain signals f. Equalization ensures that the response to mouth speech at each microphone will be equal, i.e., the difference between any two of the equalized signals should in theory be zero.

The equalized signals are then processed by a beamformer/noise reference generator 214, which generates two sets of sub-array signals 246, 248, in which each sub-array signal includes a sub-combination of the n equalized signals. For example, in a microphone array 50 having eight channels (i.e., n=8), the first sub-array may include four sub-combinations that each uniquely combine four of the eight channels, e.g., sub-array_1.1=[1,2,3,4] (made up of channels 1, 2, 3, and 4); sub-array_1.2=[1,6,7,8] (made up of channels 1, 6, 7, and 8); sub-array_1.3=[1,6,3,8] (made up of channels 1, 6, 3, and 8); and sub-array_1.4=[2,3,6,7] (made up of channels 2, 3, 6, and 7); and the second set of sub-arrays may likewise include four sub-combinations that uniquely combine four of the eight channels, e.g., [1,2,3,5], [2,5,7,8], [1,6,7,8], and [2,3,4,5].

The first set of sub-arrays is selected to include signals originating from a direction associated with the mouth of the user, which are generated from a fixed coefficient beamformer. The fixed beamformer coefficients may for example be designed using a minimum variance distortionless response (MVDR) algorithm. All of the outputs of the first set of sub-array signals 246 are designed to have unity response to the mouth speech while attenuating noise in other directions. Ideally sub-arrays should be chosen such that each sub-array gives the same response to the speech signal but has a different response to the noise field. Any sub-array size may be utilized, however four sub-combinations is reasonably optimal for many applications. Further, choosing a large number of microphones channels for sub-combinations in a sub-array has diminishing returns and can also hinder output quality (i.e., naturalness of speech). The physical size of the microphone array 210 and their location will largely dictate how many sub-array permutations will give beneficial results. As mentioned, additional boom-let devices (including binaural boom microphones) could be added to the microphone array, which can improve the overall performance. In general, the closer such microphone can be placed to the mouth without sacrificing any proposed design objectives, the better the raw signal to noise ratio (SNR) of the voice pickup will be due to near field effects.

The second set of sub-array signals 248 comprise signals originating from directions other than the mouth of the user (referred to as "noise sources" or the "noise field"), and are designed to do the opposite of the first set of sub-array signals 246. Namely the second sub-array is designed to reject signals coming from the mouth direction and pick up the rest of the noise field as much as possible. As described in further detail below, these signals are used to adaptively steer a null toward the noise sources. Thus, the more signals 248 from the second sub-array having independent information, the more noise sources the adaptive system can steer the null towards.

Once generated, the first set of sub-array signals 246 are fed into a primary generator 216 that combines the signals into a primary signal 250, which is then fed into an adaptive filter 218. The second set of sub-array signals 248 form a set of noise reference signals that are utilized by the adaptive filter 218 to adaptively steer a null towards the direction of the noise sources to generate an enhanced primary signal 252. Namely, the noise reference signals are utilized to adjust a set of filter coefficients in the adaptive filter 218 to match the changing noise field.

During periods when voice is present, it is undesirable to adjust the filter coefficients, as the adjustment may cancel out the voice signal as well. Accordingly VAD system 120 is employed to detect voice activity and provide a control signal 260 from a VAD controller 238 that freezes the filter coefficients in the adaptive filter 218 when the presence of voice is detected. In the illustrative VAD system 120 shown, a microphone VAD 234 is combined with an accelerometer VAD 236 to enhance system performance. Microphone VAD 234 evaluates the difference between the null signals (i.e., the second set of sub-arrays 248) and the primary signal 250 to detect voice activity. This alone however can lead to false positives. Accordingly, the microphone VAD 234 results are combined with the accelerometer VAD 236 results by VAD controller 238 to calculate a more robust voice activity determination. Alternative systems may instead use only one of the microphone VAD 234 and accelerometer VAD 236.

In examples wherein an accelerometer VAD is used, accelerometer VAD 236 may utilize a wide band accelerometer 226 that can make good contact, e.g., with the user's head, to sense bone conducted vibration of the user's voice. A proposed scheme is illustrated in which an acoustic microphone 224 is placed in close proximity to the accelerometer 226, but away from the mouth, e.g., near the back of the head. For example, the acoustic microphone 224 and accelerometer 226 can be mounted to an inside surface of the crown 30, a back strap of the head mount 20, proximate the temple region 110, proximate the rear 140 of the crown 30, or other locations where the accelerometer can make good contact with the user's head (see FIGS. 1-2). In extreme noise or wind conditions the performance of the microphone array 50 or the like may degrade, so it can be beneficial to use the accelerometer signal directly for the outputted voice signal to maintain relatively better intelligible communication. However, some commercial accelerometers that provide good quality bone conducted voice pickup are often also sensitive to acoustic noise, which can make it difficult to set universal bone conducted voice activity thresholds. Accordingly, by providing a system with both an accelerometer 226 and a microphone 224 and transforming both signals into the frequency domain 228, the microphone noise pickup signal can be used by noise reducer 232 to filter out the acoustic noise in the accelerometer signal, thus enabling a more robust bone conduction signal, which is easily threshold-able for an accelerometer VAD 236. Note that the accelerometer signal may first be passed through bandpass filter 230 to provide signal conditioning and reject unwanted signals.

Furthermore, in cases of extreme noise or wind conditions, the resulting signal from the noise reducer 232 in the VAD system 120 can be used directly for voice communication, rather than using microphone array 50. Namely, after the resulting signal from the noise reducer 232 is converted back into the time domain t at 222a, a multiplexor 240 can selectively use the resulting signal for voice communication if extreme noise or wind conditions are detected.

A wind detector 243 to control the multiplexor 240 may be utilized in which the energy of the fixed beamformer sub-array output 246 is monitored against the "un-arrayed" microphone energy 245 from the equalizer subsystem 212 (note that energy from a single microphone in the microphone array 50 is sufficient, but more microphone signals could be used as well). In normal microphone array 50 operations (i.e., an un-degraded array), the energy of output 246 should be less than or equal to the un-arrayed microphone energy 245. Accordingly, the wind detector 243 may compare the energy of output 246 against a threshold (e.g., 1.0). If exceeded, the system could initially switch to an altered microphone array that is less sensitive to wind (e.g., a sum of all outputs from the equalizer subsystem 212). If the performance of this altered microphone array still exceeds the un-arrayed energy 245 by a second threshold, then the accelerometer 226 can be used. The second threshold may be selected using a tuning process that determines when the accelerometer signal is better quality than the microphone array 50 signals. In a further embodiment, the accelerometer signals could be mixed in with frequency bands of the microphone array 50 signals where wind energy is most problematic.

Returning back to the operation of the adaptive filter 218, once the enhanced primary signal 252 is generated, noise suppression system 220 may be deployed to further process the enhanced primary signal 252, which is then converted back to the time domain t at 222b to generate a final primary voice signal 254. Assuming normal (non-extreme) conditions, multiplexor 240 selects and outputs the primary voice signal 254 to output channel 244. Prior to being output, the signal may be subject to a post processing system 242, which for example: (1) equalizes (i.e., frequency shapes) the output to ensure an intelligible, natural signal; and (2) applies automatic gain control (AGC) to automatically maintain the output at a consistent level despite the levels picked up by the microphones.

Noise suppression system 220 may be utilized to address environments having complex multiple noise sources, e.g., party babble, etc. In one illustrative implementation, noise suppression system 220 may spectrally subtract noise from the enhanced primary signal 252 using an appropriately equalized noise reference signal.

Figure 4:
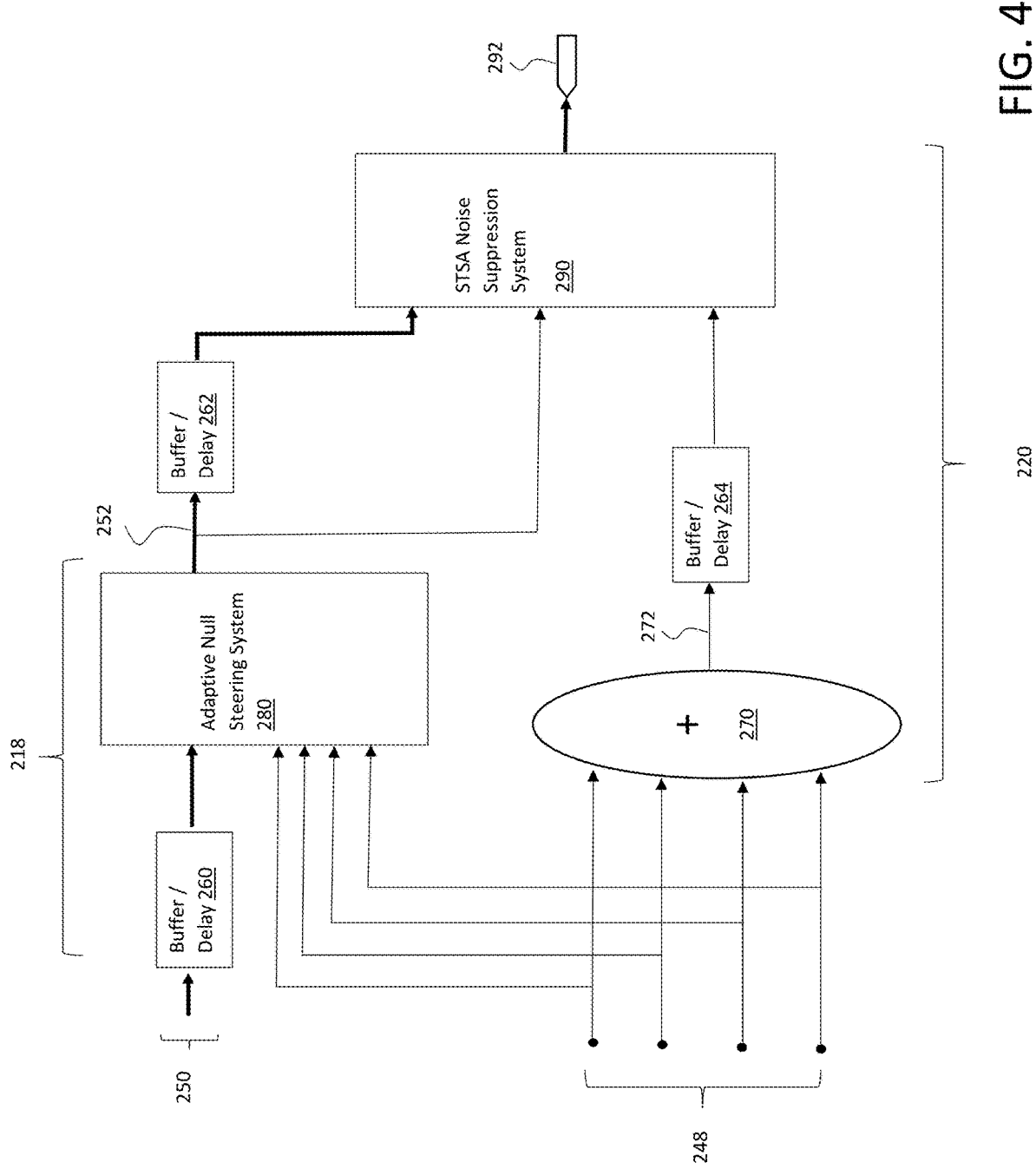
FIG. 4 depicts an adaptive filter and noise suppression system according to various implementations.

FIG. 4 depicts a detailed illustrative diagram of a system for implementing the adaptive filter 218 and noise suppression system 220 of FIG. 3. In this embodiment, the adaptive filter 218 is implemented with a buffer/delay 260 and adaptive null steering system 280 that generates the enhanced primary signal 252. As shown, the primary signal 250 is first passed through the delay/buffer 260 and then into the adaptive null steering system 280, along with noise reference signals (i.e., second sub-array) 248. Adaptive null steering system 280 utilizes, e.g., an MVDR algorithm, to produce a null toward the direction of signals not of interest, i.e., noise reference signals 248, which creates the enhanced primary signal 252.

Once generated, the enhanced primary signal 252 is processed noise suppression system 220, which includes a weighted noise reference generator 270, buffer/delays 262, 264 and Short-Time Spectral Amplitude estimation (STSA) noise suppression system 290. In this embodiment, enhanced primary signal 252 is fed through a look-ahead buffer delay 262, and on to STSA noise suppression system 290 (along with a non-delayed version of enhanced primary signal 252). In addition, weighted noise reference generator 270 combines the noise reference signals 248 using weighted combinations into a single noise reference signal 272, which is then passed through a buffer/delay 264, and then to STSA noise suppression system 290. STSA noise suppression system 290 uses an equalization process in which the reference signal 272 spectral magnitude level is matched to the noise spectral magnitude level from the enhanced primary signal 252. An initial default equalization curve is utilized, which is gradually updated during non-speech activity to the specific environment based on a noise field analysis. As noted, the system spectrally subtracts the equalized noise reference signal from the enhanced primary signal 252 to generate a resulting voice output signal 292 from the STSA noise suppression system 290.

Figure 5:
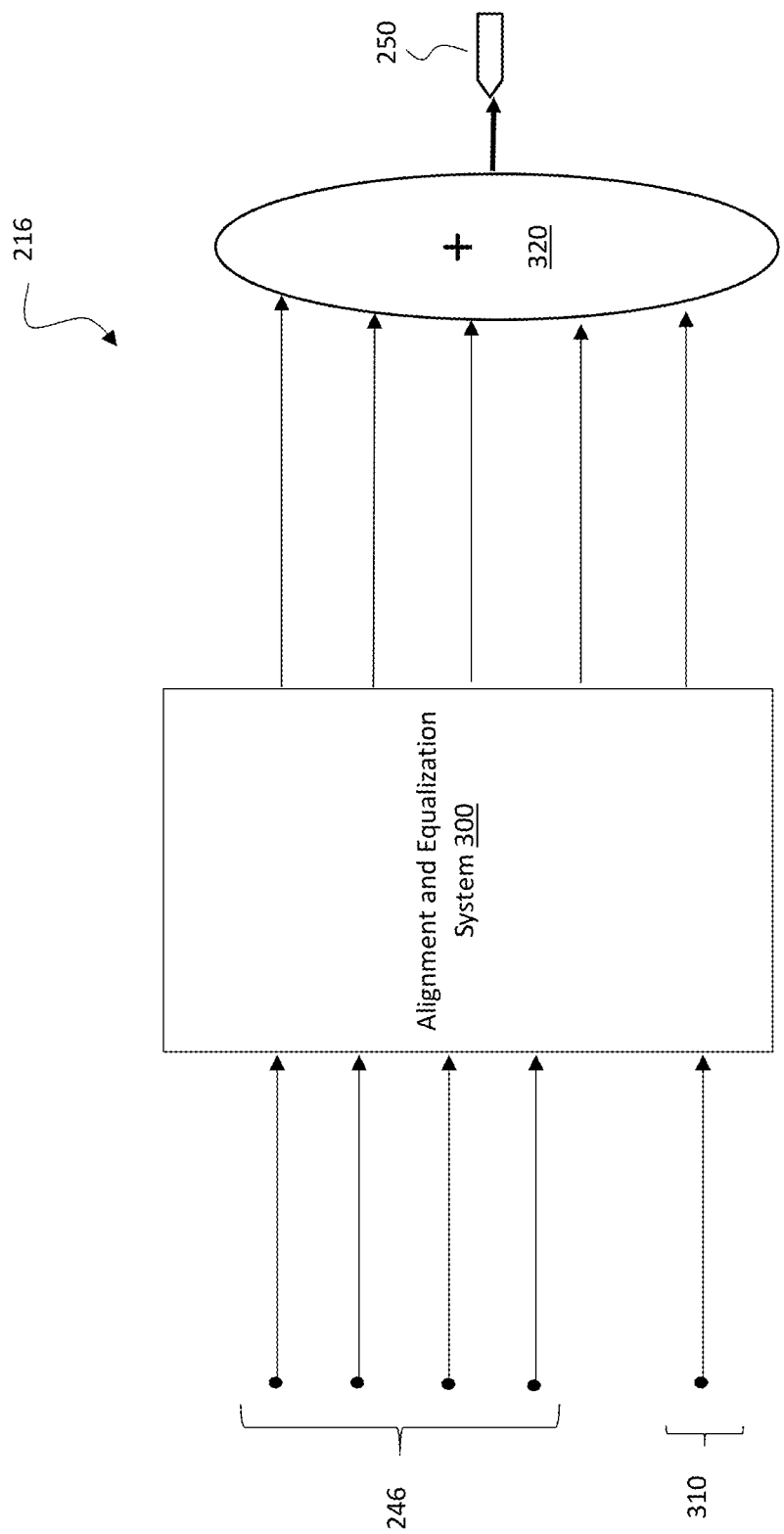
FIG. 5 depicts a primary generator according to various implementations.

FIG. 5 depicts a detailed illustrative diagram of a primary generator 216 for generating primary signal 250 from the first set of sub-arrays 246 and a delay and sum signal 310, obtained by the beamformer. In this example an alignment and equalization system 300 is utilized that aligns and equalizes the signals to the mouth of the user. The alignment and equalization process ensures that the signals summed by the adder will reinforce the mouth speech while suppressing any signals that are not aligned, namely the noise signal. The resulting signals are sent to an adder 320, which uses weighted sums to generate the primary signal 250.

Figure 6:
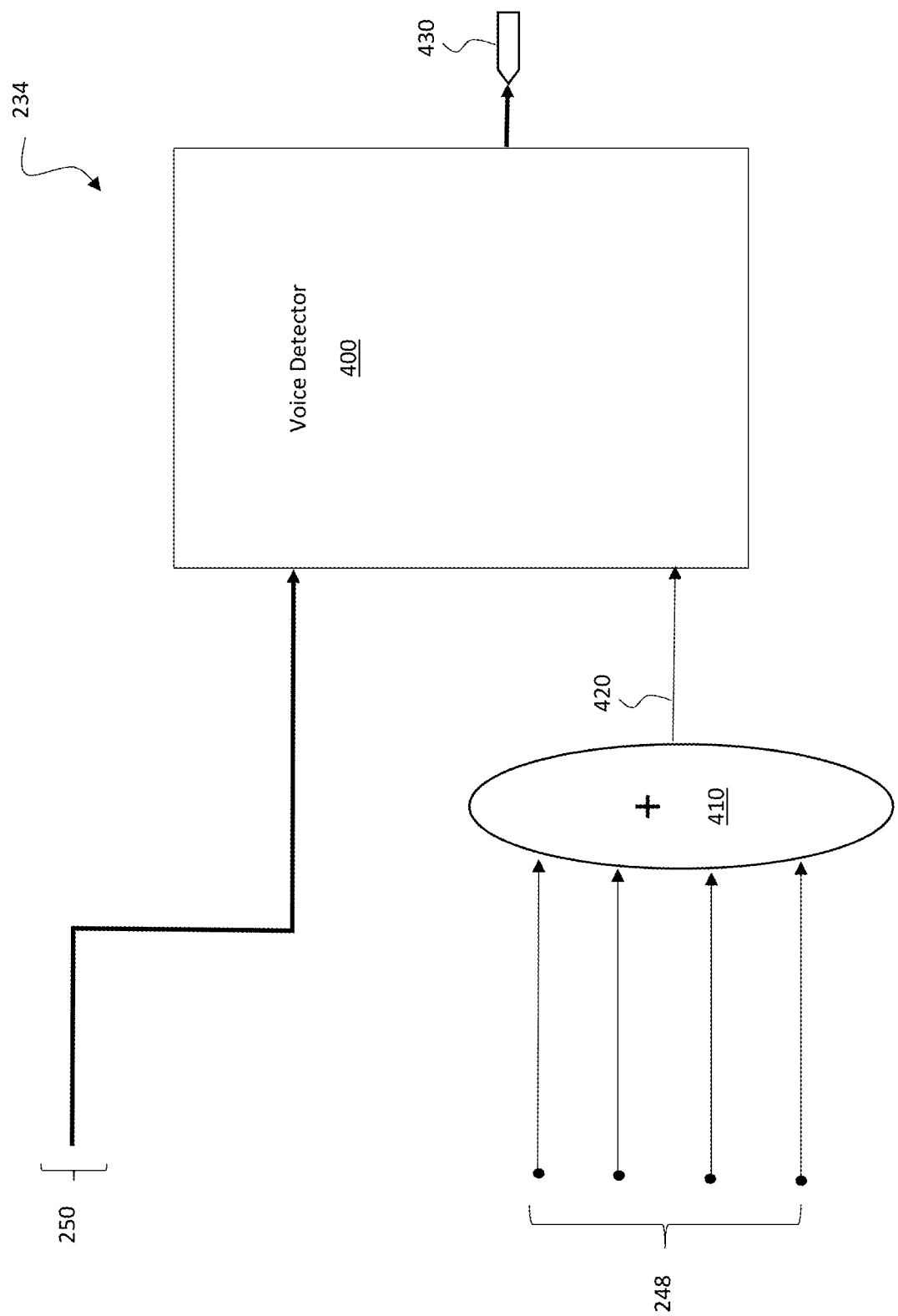
FIG. 6 depicts a microphone voice activity detector according to various implementations.

FIG. 6 depicts a detailed illustrative diagram of a microphone VAD 234. As shown, the noise reference signals 248 are combined by adder 410 using weighted sums to generate a noise reference signal 420, which is input to the voice detector 400 along with the primary signal 250. Based on an analysis of the primary signal and noise reference signal 420, a determination is made whether voice is detected. A resulting flag 430 is output indicating a detection of voice or no detection of voice.

Particular approaches for implementing a wearable device having an audio processing system are further illustrated in U.S. patent application Ser. No. 16/571,425 ("Wearable Audio Device with Brim-Mounted Microphones"), filed on Sep. 16, 2019, which is hereby incorporated by reference.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA (field programmable gate array) and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A method of enhancing speech from a user of a wearable audio device, the method comprising:
receiving a plurality of signals derived from an array of microphones;
processing the plurality of signals with a fixed coefficient beamformer to generate a first set of sub-array signals that preserve signals originating from a mouth of the user and a second set of sub-array signals associated with noise sources originating from directions other than the mouth of the user, wherein each sub-array signal comprises a sub-combination of signals from the array of microphones, and wherein sub-combinations from the first set of sub-array signals are selected to independently pick up speech signals of the user and sub-combinations from the second set of sub-array signals are selected to independently pick up noise sources;
generating a primary signal by combining the first set of sub-array signals; and
processing the primary signal with a filter, wherein the filter utilizes the second set of sub-array signals as a set of noise reference signals to steer a null towards the noise sources to generate an enhanced primary signal.

2. The method of claim 1, further comprising spectrally subtracting an equalized noise reference signal from the enhanced primary signal to provide a primary voice signal.

3. The method of claim 1, wherein the filter comprises an adaptive filter and filter coefficients associated with the adaptive filter are adjusted when a lack of voice activity is detected by a voice activity detector (VAD) system located at the wearable audio device.

4. The method of claim 3, wherein filter coefficients associated with the adaptive filter are frozen when voice activity is detected by the voice activity detector (VAD) system.

5. The method of claim 4, wherein the VAD system comprises an accelerometer VAD in combination with a microphone VAD.

6. The method of claim 5, wherein the VAD system comprises an accelerometer and an acoustic microphone, wherein the acoustic microphone provides a noise reference to filter residual noise signal pickup by the accelerometer.

7. The method of claim 6, wherein the accelerometer is utilized in place of the microphone array to generate a primary voice signal when extreme noise conditions are detected by a wind detector.

8. The method of claim 1, wherein the array of microphones is coupled with an underside of a brim, and wherein the brim is configured to shield the array of microphones from wind.

9. The method of claim 8, wherein the array of microphones comprises at least one boom-let device.

10. The method of claim 1, wherein generating the primary signal comprises combining the first set of sub-array signals using weighted sums.

11. The method of claim 1, wherein the fixed coefficient beamformer uses a minimum variance distortionless response (MVDR) algorithm.

12. The method of claim 1, wherein the wearable audio device comprises at least one of: a hat, a helmet, a visor, a wig, or a hood.

13. A wearable audio device, comprising:
an array of microphones; and
an audio processing system for processing audio signals from the array of microphones, comprising:
a system for analyzing the audio signals and generating a first set of sub-array signals that preserve signals originating from a mouth of a user using a fixed coefficient beamformer, and generating a second set of sub-array signals associated with noise sources originating from directions other than the mouth of the user, wherein each sub-array signal comprises a sub-combination of signals from the array of microphones, and wherein sub-combinations from the first set of sub-array signals are selected to independently pick up speech signals of the user and sub-combinations from the second set of sub-array signals are selected to independently pick up noise sources;
a primary generator that generates a primary signal by combining the first set of sub-array signals; and
a filter for processing the primary signal, wherein the filter utilizes the second set of sub-array signals as a set of noise reference signals to steer a null towards the noise sources to generate an enhanced primary signal.

14. The device of claim 13, further comprising a noise suppression system that spectrally subtracts an equalized noise reference signal from the enhanced primary signal to provide a primary voice signal.

15. The device of claim 13, wherein the filter comprises an adaptive filter and the adaptive filter comprises filter coefficients that are adjusted when a lack of voice activity is detected by a voice activity detector (VAD) system located at the wearable audio device.

16. The device of claim 15, wherein the filter coefficients are frozen when voice activity is detected by the VAD system.

17. The device of claim 16, wherein the VAD system comprises an accelerometer VAD in combination with a microphone VAD.

18. The device of claim 17, wherein the VAD system comprises an accelerometer and an acoustic microphone, wherein the acoustic microphone provides a noise reference to filter residual noise signal pickup by the accelerometer.

19. The device of claim 18, wherein the accelerometer is utilized in place of the microphone array to generate a primary voice signal when extreme noise conditions are detected by a wind detector.

20. The device of claim 13, wherein the wearable audio device is mountable on the head of a user and comprises a brim configured to shield the array of microphones from wind, and wherein the array of microphones is coupled with an underside of the brim.

21. The device of claim 20, wherein the array of microphones comprises at least one boom-let device.

22. The device of claim 13, wherein the primary generator combines the first set of sub-array signals using weighted sums.

23. The device of claim 13, wherein the fixed coefficient beamformer uses a minimum variance distortionless response (MVDR) algorithm.

24. The device of claim 13, wherein the wearable audio device comprises at least one of: a hat, a helmet, a visor, a wig, or a hood.

* * * * *